Jan. 3, 1967     A. WALTHER     3,295,913
HIGHLY CORRECTED WIDE ANGLE LENS SYSTEM CHARACTERIZED
BY PARTIAL CONCENTRICITY
Filed Dec. 6, 1962

INVENTOR.
Adriaan Walther
BY Morse & Altman
ATTORNEYS

United States Patent Office 3,295,913
Patented Jan. 3, 1967

3,295,913
HIGHLY CORRECTED WIDE ANGLE LENS SYSTEM CHARACTERIZED BY PARTIAL CONCENTRICITY
Adriaan Walther, Waltham, Mass., assignor, by mesne assignments, to Bank of America National Trust and Savings Association
Filed Dec. 6, 1962, Ser. No. 242,798
6 Claims. (Cl. 350—177)

The present invention relates to an extremely wide angle optical construction for use as an objective in photography and cinematography. This optical construction basically involves a substantially concentric system of lenses of the type known to suffer from spherical and axial color aberrations and field curvature.

It is an object of the present invention to correct spherical and axial color aberrations and to reduce field curvature throughout an extremely wide angle in a novel manner.

Additional objects of the present invention are: to provide an optical construction of the foregoing type which includes a substantially concentric-type primary system and a negative auxiliary system that is located before the primary system in novel combination therewith; to provide in an optical construction of the foregoing type a toric and/or compound auxiliary system that is located after the primary system; and to provide in combination with the foregoing a novel mechanical design by which internal reflection is minimized and aperture control is facilitated.

Other objects of the present invention will in part be obvious and will in part appear hereinafter.

The invention accordingly comprises the system possessing the features, properties and relationships which are exemplified in the following detailed disclosure, and the scope of which will be indicated in the appended claims.

For a fuller understanding of the nature and objects of the present invention, reference should be had to the following detailed description taken in connection with the accompanying drawing wherein.

Figure 1:
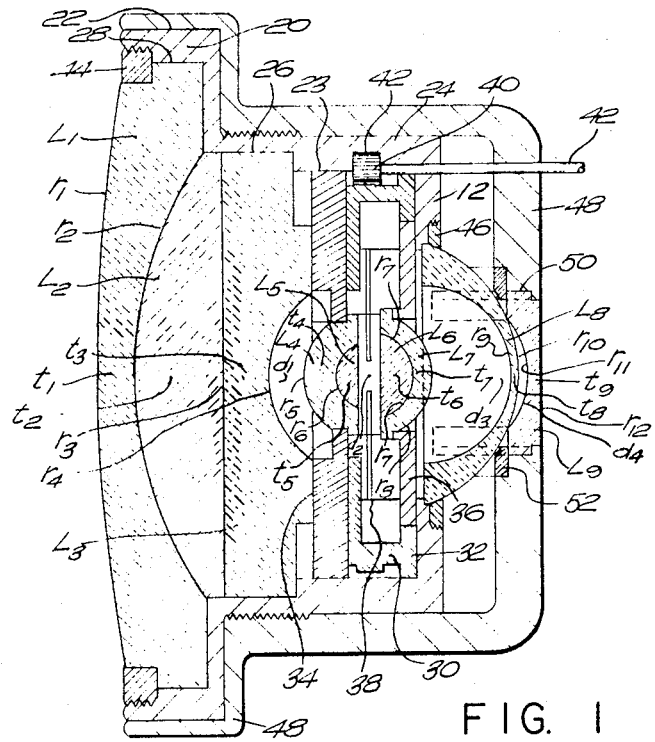
FIG. 1 is an axial cross-sectional view of a preferred optical construction of the present invention.
Figure 2:
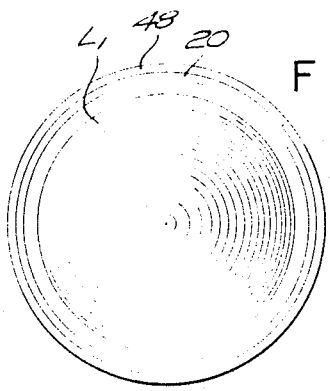
FIG. 2 is a front view of the optical construction of FIG. 1.
Figure 3:
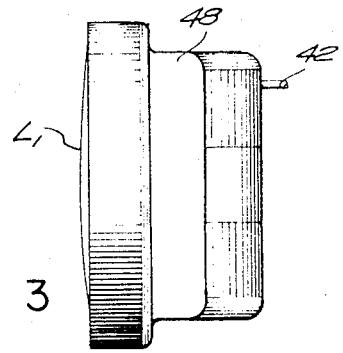
FIG. 3 is a longitudinal, external elevation of the optical construction of FIG. 1.
Figure 4:
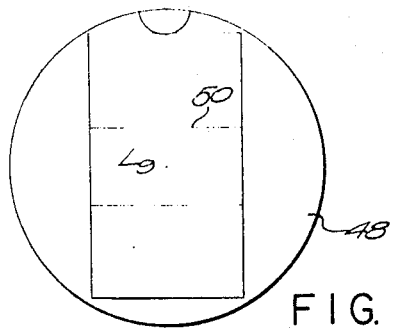
FIG. 4 is a rear view of the optical construction of FIG. 1.
Figure 5:
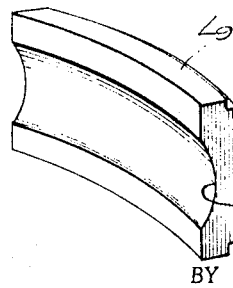
FIG. 5 is a perspective view of a component of the optical construction of FIG. 1.

The illustrated optical construction is shown in FIG. 1 as including a negative system I, a substantially concentric system II and a toric system III, in forward, medial and rearward positions respectively. Negative system I is a cemented triplet including: lens $L_1$ having radii $r_1$, $r_2$ and thickness $t_1$; lens $L_2$ having radii $r_2$, $r_3$ and thickness $t_2$; lens $L_3$ having radii $r_3$, $r_4$ and thickness $t_3$. Although in the illustrated embodiment, the interface between lenses $L_2$ and $L_3$ is flat, this interface may be very slightly curved to control distortion as desired. Substantially concentric system II includes a positive cemented doublet of lenses $L_4$, $L_5$ and positive cemented doublet of lenses $L_6$, $L_7$, these doublets being spaced from each other for a reason to be explained below. Lens $L_4$ has radii $r_5$, $r_6$ and thickness $t_4$; lens $L_5$ has radius $r_6$, a flat rearward face normal to the optical axis and thickness $t_5$; lens $L_6$ has a flat forward face normal to the optical axis, a radius $r_7$ and thickness $t_6$; lens $L_7$ has radii $r_7$, $r_8$ and thickness $t_7$. The rearward face of $L_5$ and the forward face of $L_6$ have not been designated as having significant radii because both $L_5$ and $L_6$ are composed of the same material and may be considered as integral. Toric system III includes: lens $L_8$ having radii $r_9$, $r_{10}$ and thickness $t_8$; and lens $L_9$ having radii $r_{11}$, $r_{12}$ in the vertical direction (FIG. 1), radii $r_{13}$, $r_{14}$ in the horizontal direction (FIG. 5) and thickness $t_9$. The gaps from $L_3$ to $L_4$, from $L_5$ to $L_6$, from $L_7$ to $L_8$ and from $L_8$ to $L_9$ are designated $d_1$, $d_2$, $d_3$ and $d_4$, respectively. Gaps $d_1$, $d_3$ and $d_4$ are air filled. Gap $d_2$ is filled with a liquid, i.e. a silicone oil, having an index of refraction similar to those of lenses $L_5$ and $L_6$, a silicone oil being preferred because it is characterized by a small change of index of refraction as a function of temperature.

In order to correct chromatic aberration to a high degree, to correct monochromatic aberration for a very wide field of view and to reduce field curvature to an acceptably small value, negative system I and concentric system II must satisfy the following conditions, where $v$ refers to Abbe number and $f'$ refers to the effective focal length of the total system.

(1) $$\frac{0.50}{v_{L_3}} < \frac{1}{v_{L_2}} - \frac{1}{v_{L_1}} < \frac{1.25}{v_{L_3}};$$

(2) $r_1 > 2.5 f'$;

(3) $|r_3| > 2.5 f'$; and (4) Concentric system II is herein referred to as a "substantially concentric system" because it is characterized by a slight deviation from concentricity, which serves to obviate coma inherently introduced by negative system I and toric system III. The degree of deviation from concentricity is limited by the requirement that the rear surface of lens $L_3$ and the surfaces of the substantially concentric system, i.e. the surfaces designated by $r_4$, $r_5$, $r_6$, $r_7$ and $r_8$, must lie in an interval on the axis of symmetry, the length of which does not exceed $0.4 f'$.

Generally, subparagraph (1) above functions to correct lateral color, subparagraph (2) above functions to keep astigmatism at an acceptable level, and subparagraph (3) above functions to keep spherical aberration at a level at which it can be compensated for by the other specified relationships. It will be appreciated that all of these relationships are such that their only precise definitions are in terms of the mathematical relationships set forth above. The equations of the aforementioned sub-paragraphs, which are the design result of initial very wide angle requirements and successive ray tracing approximations, define optimum ranges outside of which the lens system would become unacceptable to persons skilled in the art.

The following example lists representative numerical values for the radii, thicknesses, indices of refraction and Abbe numbers of a system embodying the present invention, in which: $f' = 1''$; horizontal field $= 146°$; vertical field $= 55°$; $F/ = 3.3$; and sign is assumed to be positive unless specifically indicated to be negative (—).

| Lens System | | Radius | Thickness and Spacing | $n_d$ | $v$ |
|---|---|---|---|---|---|
| I | $L_1$ | $r_1=14.2''$ | $t_1=0.24''$ | 1.6073 | 59.48 |
|  | $L_2$ | $r_2=2.90''$ | $t_2=0.66''$ | 1.6364 | 35.35 |
|  | $L_3$ | $r_3=$ infinite | $t_3=0.36''$ | 1.4875 | 70.04 |
|  |  | $r_4=0.733''$ | $d_1=0.29''$ | Air |  |
|  |  | $r_5=0.441''$ |  |  |  |
| II(a) | $L_4$ | $r_6=0.214''$ | $t_4=0.23''$ | 1.7552 | 27.53 |
|  | $L_5$ |  | $t_5=0.16''$ | 1.5174 | 52.16 |
|  |  |  | $d_2=0.15''$ | 1.5174 (silicone oil) | 52.16 |
| II(b) | $L_6$ | $r_7=-0.297''$ | $t_6=0.25''$ | 1.5174 | 52.16 |
|  | $L_7$ |  | $t_7=0.14''$ | 1.7552 | 27.53 |
|  |  | $r_8=-0.440''$ | $d_3=0.60''$ | Air |  |
| III(a) | $L_8$ | $r_9=-0.673''$ | $t_8=0.062''$ | 1.7550 | 53.28 |
|  |  | $r_{10}=-1.034$ | $d_4=0.095''$ | Air |  |
| III(b) | $L_9$ | $r_{11}=-0.638''$ | $t_9=0.057''$ | 1.4875 | 70.04 |
|  |  | $r_{12}=$ infinite |  |  |  |
|  |  | $r_{13}=-1.91$ |  |  |  |
|  |  | $r_{14}=-1.91$ |  |  |  |

The aforementioned lenses are mounted as follows. An internal annular mount 20 is provided with an inwardly directed flange 22, a first step 28, a second step 26 and a third step 23, all of sequentially decreasing diameter. Lenses $L_2$ and $L_3$, which are circular in profile, are seated on second step 26 and lens $L_1$, which is circular in profile is seated in first step 28. Seated in third step 23 between flange 12 and lens $L_3$ is an internal annular mount 30 provided with a rearward portion 32 that abuts against flange 12 and is seated within third step 23. A ring 34, which is secured within third step 23, retains internal annular mount 30 in axial position. Seated at the inner periphery of internal annular mount 30 between ring 34 and an inwardly directed flanged extension of flange 12 are, in sequence, lens $L_4$, lens $L_5$, lens $L_6$ and lens $L_7$. The aperture of an iris diaphragm stop 38 is controlled by ring gear 40, which is rotatable with pinion 42. Iris diaphragm 38 is immersed in gap $d_2$ in a liquid, i.e. a silicone oil, which is optically similar to lenses $L_5$ and $L_6$ in composition for the purpose of eliminating internal reflection. Lens $L_1$ is held in position by a retaining ring 44. Flange 12 is threaded to receive the threaded internal periphery of a locking ring 46 which retains lens $L_8$ in axial position. The external periphery of second step 26 is threaded to receive the internal periphery of a cover mount 48. Cover mount 48 provides at its rearward extremity an elongated window 50 of rectangular profile. Lens $L_9$ is retained in window 50 by a suitable rectangular clip 52.

The present invention thus provides a panoramic lens system having unusually wide field and remarkable freedom from undesired aberration and distortion. Since certain changes may be made in the above devices without departing from the scope of the invention herein involved, it is intended that all matter contained in the above description or shown in the accompanying drawing shall be interpreted in an illustrative and not in a limiting sense.

What is claimed is:

1. A wide angle optical construction comprising sequentially a negative system, a substantially concentric system and a toric system, said negative system consisting of a triplet including lens $L_1$ having radii $r_1$, $r_2$ and thickness $t_1$; lens $L_2$ having radii $r_2$, $r_3$ and thickness $t_2$ and lens $L_3$ having radii $r_3$, $r_4$ and thickness $t_3$, said negative system being generally meniscus in form and being outwardly convex relative to said substantially concentric system, said lens $L_1$ being generally negative, said lens $L_2$ being generally positive and said lens $L_3$ being generally negative, said substantially concentric system including a doublet of lenses $L_4$, $L_5$ and a doublet of lenses $L_6$, $L_7$, lens $L_4$ having radii $r_5$, $r_6$ and thickness $t_4$, lens $L_5$ having radius $r_6$, a flat rearward face and thickness $t_5$, lens $L_6$ having a flat forward face, a radius $r_7$, and thickness $t_6$, lens $L_7$ having radii $r_7$, $r_8$ and thickness $t_7$, said toric system including lens $L_8$ having radii $r_9$, $r_{10}$ and thickness $t_8$, and lens $L_9$ having radii $r_{11}$, $r_{12}$ in the vertical direction, radii $r_{13}$, $r_{14}$ in the horizontal direction and thickness $t_9$, lenses $L_3$ and $L_4$ defining a gap therebetween of length $d_1$, lenses $L_5$ and $L_6$ defining a gap therebetween of length $d_2$, lenses $L_7$ and $L_8$ defining a gap therebetween of length $d_3$ and lenses $L_8$ and $L_9$ defining a gap therebetween of length $d_4$, said forward surface of said lens $L_9$ being substantially toroidal and said rearward surface of said lens $L_9$ being substantially cylindrical.

2. The optical construction of claim 1 wherein a diaphragm stop is positioned in gap $d_2$.

3. The optical construction of claim 2 wherein said gap $d_2$ contains a liquid having optical characteristics analogous to those of portions of said substantially concentric system contiguous therewith.

4. The optical construction of claim 1 wherein a diaphragm stop is positioned in gap $d_2$ and a silicone oil is contained by gap $d_2$, said silicone oil having optical characteristics analogous to those of portions of said substantially concentric system contiguous therewith.

5. The optical construction of claim 1 wherein lenses $L_1$, $L_2$ and $L_3$ have Abbe numbers $v_1$, $v_2$ and $v_3$ and the focal length of the system is $f'$, and wherein:

(a) $\dfrac{0.50}{v_{L_3}} < \dfrac{1}{v_{L_2}} - \dfrac{1}{v_{L_1}} < \dfrac{1.25}{v_{L_3}}$;

(b) $r_1 > 2.5f'$;

(c) $|r_3| > 2.5f'$; and (d) said rear surface of lens $L_3$ and the surfaces of the substantially concentric system, i.e. the surfaces designated by $r_4$, $r_5$, $r_6$, $r_7$ and $r_8$, lying in an interval on the axis of symmetry, the length of which does not exceed $0.4f'$.

6. The optical construction of claim 1 wherein the characteristics of said first system designated by I, said second system designated by II(a) and II(b) and said third system designated by II(a) and III(b), are as follows:

| Lens System | | Radius | Thickness and Spacing | $n_d$ | $v$ |
|---|---|---|---|---|---|
| I | $L_1$ | $r_1=14.2''$ | $t_1=0.24''$ | 1.6073 | 59.58 |
|  | $L_2$ | $r_2=2.90''$ | $t_2=0.66''$ | 1.6364 | 35.35 |
|  | $L_3$ | $r_3=$ infinite | $t_3=0.36''$ | 1.4875 | 70.04 |
|  |  | $r_4=0.733''$ | $d_1=0.29''$ | Air |  |
|  |  | $r_5=0.441''$ |  |  |  |
| II(a) | $L_4$ | $r_6=0.214$ | $t_4=0.23''$ | 1.7552 | 27.53 |
|  | $L_5$ |  | $t_5=0.16''$ | 1.5174 | 52.16 |
|  |  |  | $d_2=0.15$ | 1.5174 | 52.16 |
| II(b) | $L_6$ | $r_7=-0.297''$ | $t_6=0.25$ | 1.5174 | 52.16 |
|  | $L_7$ |  | $t_7=0.14''$ | 1.7552 | 27.53 |
|  |  | $r_8=-0.440''$ | $d_3=0.60''$ | Air |  |
| III(a) | $L_8$ | $r_9=-0.673''$ | $t_8=0.062$ | 1.7550 | 52.38 |
|  |  | $r_{10}=-1.034$ | $d_4=0.095''$ | Air |  |
| III(b) | $L_9$ | $r_{11}=-0.638''$ | $t_9=0.057''$ | 1.4875 | 70.04 |
|  |  | $r_{12}=$ infinite |  |  |  |
|  |  | $r_{13}=-1.91$ |  |  |  |
|  |  | $r_{14}=-1.91$ |  |  |  |

References Cited by the Examiner

UNITED STATES PATENTS 2,522,390  9/1950  McCarthy.
3,151,524  10/1964  Bouwers _____ 88—57

FOREIGN PATENTS 2,193  1859  Great Britain.

JEWELL H. PEDERSEN, *Primary Examiner.*

JOHN K. CORBIN, *Assistant Examiner.*